(12) United States Patent
Tomokawa (10) Patent No.: US 11,145,259 B2
(45) Date of Patent: Oct. 12, 2021

(54) LIQUID CRYSTAL DISPLAY DEVICE

(71) Applicant: SHARP KABUSHIKI KAISHA, Sakai (JP)

(72) Inventor: Shinji Tomokawa, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/868,441

(22) Filed: May 6, 2020

(65) Prior Publication Data

US 2020/0365093 A1 Nov. 19, 2020

Related U.S. Application Data

(60) Provisional application No. 62/847,325, filed on May 14, 2019.

(51) Int. Cl.
| | |
|---|---|
| *G09G 3/34* | (2006.01) |
| *G02F 1/133* | (2006.01) |
| *G09G 3/36* | (2006.01) |
| *G02F 1/1335* | (2006.01) |
| *G02F 1/13357* | (2006.01) |

(52) U.S. Cl.
CPC ....... *G09G 3/3406* (2013.01); *G02F 1/13318* (2013.01); *G02F 1/13362* (2013.01); *G02F 1/133528* (2013.01); *G02F 1/133553* (2013.01); *G09G 3/3648* (2013.01); *G09G 2320/0257* (2013.01); *G09G 2360/14* (2013.01)

(58) Field of Classification Search
CPC ............... G09G 3/3406; G09G 3/3648; G09G 2320/0257; G09G 2360/14; G02F 1/13318; G02F 1/133528; G02F 1/133553; G02F 1/13362
See application file for complete search history.

(56) References Cited

U.S. PATENT DOCUMENTS

| | | | |
|---|---|---|---|
| 8,570,468 B2 * | 10/2013 | Moon | G02F 1/133512 349/116 |
| 10,845,904 B2 * | 11/2020 | Kim | G02F 1/133514 |
| 2008/0284720 A1 * | 11/2008 | Fukutome | G09G 3/3406 345/102 |
| 2009/0135167 A1 * | 5/2009 | Sakai | G02F 1/13318 345/207 |
| 2009/0147191 A1 * | 6/2009 | Nakajima | G02F 1/13338 349/116 |

(Continued)

FOREIGN PATENT DOCUMENTS

| | | |
|---|---|---|
| JP | 2009-003433 A | 1/2009 |
| JP | 2019-191189 A | 10/2019 |
| WO | 2011/001726 A1 | 1/2011 |

*Primary Examiner* — Ricardo Osorio
(74) *Attorney, Agent, or Firm* — ScienBiziP, P.C.

(57) ABSTRACT

Provided is a liquid crystal display device wherein blurring of a moving image is effectively suppressed. A liquid crystal display device 1 includes a liquid crystal layer 13 that is arranged on a backlight 10, and includes liquid crystal that is driven in response to a voltage applied thereto; a light detection unit 20 that is arranged between the backlight 10 and the liquid crystal layer 13; and a control unit that controls a timing of turning on the backlight 10. After the backlight 10 is turned off and driving of liquid crystal is started, the control unit turns on the backlight 10 when intensity of light detected by the light detection unit 20 enters a steady state.

5 Claims, 7 Drawing Sheets

(56) References Cited

U.S. PATENT DOCUMENTS

| | | | |
|---|---|---|---|
| 2010/0128010 A1* | 5/2010 | Katoh | G09G 3/3406 345/207 |
| 2011/0057908 A1* | 3/2011 | Park | G06F 3/042 345/176 |
| 2011/0063243 A1* | 3/2011 | Kim | G06F 3/0412 345/174 |
| 2012/0086628 A1 | 4/2012 | Ichioka et al. | |
| 2012/0169962 A1* | 7/2012 | Yuki | G06F 3/042 349/61 |
| 2013/0278577 A1* | 10/2013 | Beon | G06F 3/0412 345/207 |
| 2019/0257639 A1 | 8/2019 | Tomida et al. | |
| 2019/0257669 A1 | 8/2019 | Fujiura et al. | |
| 2019/0257671 A1 | 8/2019 | Osabe et al. | |

* cited by examiner

LIQUID CRYSTAL DISPLAY DEVICE

TECHNICAL FIELD

The following disclosure relates to a liquid crystal display device.

BACKGROUND ART

A liquid crystal display device drives liquid crystal to control the oscillation direction of light, and selectively transmits or blocks a component in a specific oscillation direction with use of a polarizing plate, thereby displaying an image. It however takes a certain time to drive liquid crystal. This causes a user to perceive an image in the middle of the driving of liquid crystal, thereby causing the user to see the moving image displayed on the liquid crystal display device being blurred (an afterimage is present). In particular, in a head-mounted display in which a liquid crystal display device and a user's eyes are positioned at a small distance therebetween, the user tends to perceive that a moving image is blurred in some cases.

An exemplary liquid crystal display device in which such "blurring of a moving image" is suppressed is one in which a backlight is intermittently turned on at such a frequency that a human cannot perceive it. This liquid crystal display device drives liquid crystal when the backlight is turned off, so as to make it unlikely that an image before the completion of the driving of liquid crystal would be perceived by a user. For example, JP-A-2009-3433 proposes a liquid crystal display device in which a backlight is intermittently turned on while being controlled by calculating changes in the brightness of the backlight and the response time of the liquid crystal based on an output of a light sensor.

In this liquid crystal display device, however, the backlight is turned on during the driving of the liquid crystal, in a case where the calculated response time of liquid crystal is shorter than a time that it actually takes to drive the liquid crystal. In this liquid crystal display device, therefore, it is not possible to effectively suppress blurring of a moving image.

SUMMARY

To solve the above-described problem, a liquid crystal display device according to one embodiment includes: a backlight; a liquid crystal layer that is arranged on the backlight, and includes liquid crystal that is driven in response to a voltage applied thereto; a light detection unit that is arranged between the backlight and the liquid crystal layer; and a control unit that controls a timing of turning on the backlight, wherein, after the backlight is turned off and the driving of liquid crystal is started, the control unit turns on the backlight when intensity of light detected by the light detection unit enters a steady state.

In the liquid crystal display device with the above-described configuration, the control unit turns on the backlight, after confirming that the driving of liquid crystal is completed. In this liquid crystal display device, therefore, it is possible to effectively suppress blurring of a moving image.

EMBODIMENTS

The following description describes some embodiments in detail, while referring to the drawings. Identical or equivalent parts in the drawings are denoted by the same reference numerals, and the descriptions of the same are not repeated. To make the explanation easy to understand, in the drawings referred to hereinafter, the configurations are simply illustrated or schematically illustrated, or the illustration of part of constituent members is omitted. Further, dimension ratios of constituent members illustrated in the drawings do not necessarily indicate actual dimension ratios.

Embodiment 1

Figure 1:
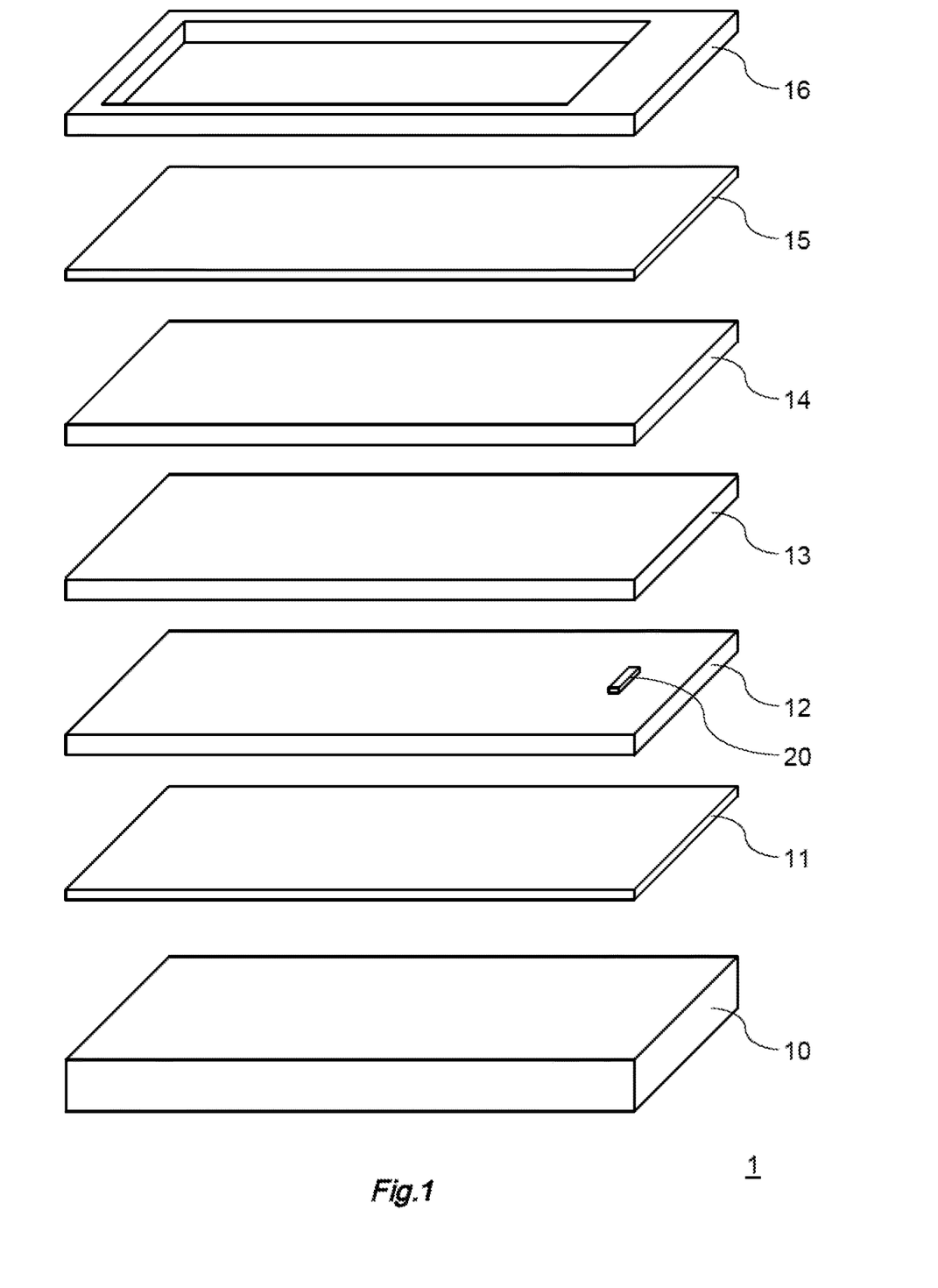
FIG. 1 is an exploded perspective view illustrating a schematic configuration of a liquid crystal display device 1 according to Embodiment 1.

FIG. 1 is an exploded perspective view illustrating a schematic configuration of a liquid crystal display device 1 according to Embodiment 1. As illustrated in FIG. 1, the liquid crystal display device 1 includes a backlight 10, a lower polarizing plate 11, a lower glass substrate 12, a liquid crystal layer 13, an upper glass substrate 14, an upper polarizing plate 15, and a bezel 16, which are stacked in this order. Incidentally, hereinafter a direction toward a side where the liquid crystal layer 13 is present, when viewed from the backlight 10, is referred to an upward direction, and the opposite direction is referred to as a downward direction in the liquid crystal display device 1.

The backlight 10 emits planar light in the upward direction. The backlight 10 includes a light source that can be turned on and off so quickly that a human cannot perceive, such as light emitting diodes (LEDs). The lower polarizing plate 11 selectively transmits light components that oscillates in a first direction, out of light emitted by the backlight 10.

The liquid crystal layer 13 include liquid crystal that controls the oscillation direction of light having been transmitted through the lower polarizing plate 11. Each of the lower glass substrate 12 and the upper glass substrate 14, which are arranged so that the liquid crystal layer 13 is interposed therebetween, include electrodes for applying voltages to the liquid crystal. Further, the upper glass substrate 14 also includes a color filter that selectively transmits components having specific wavelengths (colors), out of light having been transmitted through the liquid crystal layer 13. For example, the color filter has such a configuration that filters that transmit light of red color, filters that transmit light of green color, and filters that transmit light of blue color are arrayed in a predetermined pattern (for example, a stripe array or a mosaic array).

The upper polarizing plate 15 selectively transmits light components that oscillate in a second direction, out of light having been transmitted through the upper glass substrate 14. The first direction, which is the oscillation direction of light that the lower polarizing plate 11 transmits, and the second direction, which is the oscillation direction of light that the upper polarizing plate 15 transmits, have relationship that varies depending on the display method.

For example, the first direction and the second direction perpendicularly intersect in the vertical alignment (VA) method or the in-plane switching (IPS) method. In these methods, light having been transmitted through the lower polarizing plate 11 contains components that oscillate in the first direction. When the oscillation direction of the light having been transmitted through the lower polarizing plate 11 is changed by liquid crystal, components thereof that oscillate in the second direction increase. Then, these components thus increased are transmitted through the upper polarizing plate 15. On the other hand, when the oscillation direction of the light having been transmitted through the lower polarizing plate 11 is not changed by liquid crystal, components thereof that oscillate in the second direction do not increase, and are blocked by the upper polarizing plate 15.

Further, for example, in the twisted nematic (TN) method, the first direction and the second direction are parallel with each other. In this method, light having been transmitted through the lower polarizing plate 11 contains components that oscillate in the first direction. When the oscillation direction of the light having been transmitted through the lower polarizing plate 11 is changed by liquid crystal, components thereof that oscillate in the second direction decrease. Then, these components thus decreased are blocked by the upper polarizing plate 15. On the other hand, when the oscillation direction of the light having been transmitted through the lower polarizing plate 11 is not changed by liquid crystal, the components thereof that oscillate in the second direction do not decrease, and are transmitted through the upper polarizing plate 15.

To the liquid crystal display device 1, any arbitrary display method can be applied. For example, any one of the above-described methods may be applied to the liquid crystal display device 1, or alternatively, a method different from those above-described methods may be applied thereto.

Figure 2:
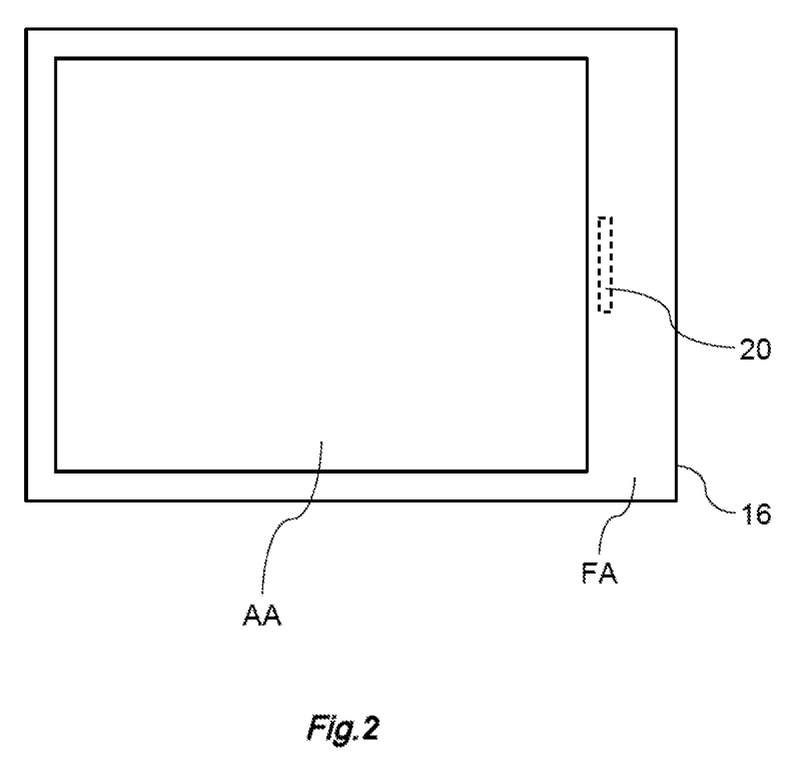
FIG. 2 is a top view of the liquid crystal display device 1.

The bezel 16 is a part of a case that houses the members 10 to 15 of the liquid crystal display device 1. FIG. 2 is a top view of the liquid crystal display device 1. As illustrated in FIG. 2, the bezel 16 is a rectangular frame-shaped flat plate having an opening inside. A user views an image displayed in the opening part of the bezel 16. Hereinafter, in the liquid crystal display device 1, an area corresponding to the opening part of the bezel 16 is referred to as a "display area AA", and an area corresponding to the frame part of the bezel 16 is referred to as a "frame area FA".

The liquid crystal display device 1 includes a light detection unit 20. The light detection unit 20 is provided between the liquid crystal layer 13 and the backlight 10. FIG. 1 illustrates an exemplary case where the light detection unit 20 is arranged on an upper surface of the lower glass substrate 12. Further, as illustrated in FIG. 2, the light detection unit 20 is provided in the frame area FA. The light detection unit 20 is formed with light receiving elements, for example, photodiodes.

Figure 3:
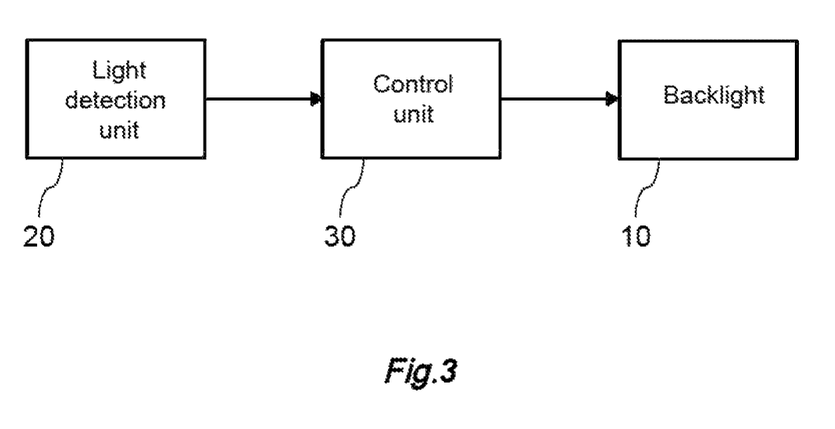
FIG. 3 is a block diagram illustrating a part involved in the control of turning on a backlight in the liquid crystal display device 1.

Next, the following description describes a method for controlling the backlight 10 using an output of the light detection unit 20. FIG. 3 is a block diagram illustrating a part involved in the control of turn-on of the backlight in the liquid crystal display device 1.

As illustrated in FIG. 3, the liquid crystal display device 1 includes a control unit 30. The control unit 30 controls timings of turning on the backlight 10 based on an output of the light detection unit 20. The control unit 30, however, may be formed, for example, as a part of a driver integrated circuit (IC) for applying a voltage signal to electrodes (pixel electrodes) included in the lower glass substrate 12, or alternatively, as a part of an integrated circuit (IC) other than the driver IC. Further alternatively, the control unit 30 may be formed as a device such as an IC independent from the other ICs.

Figure 4:
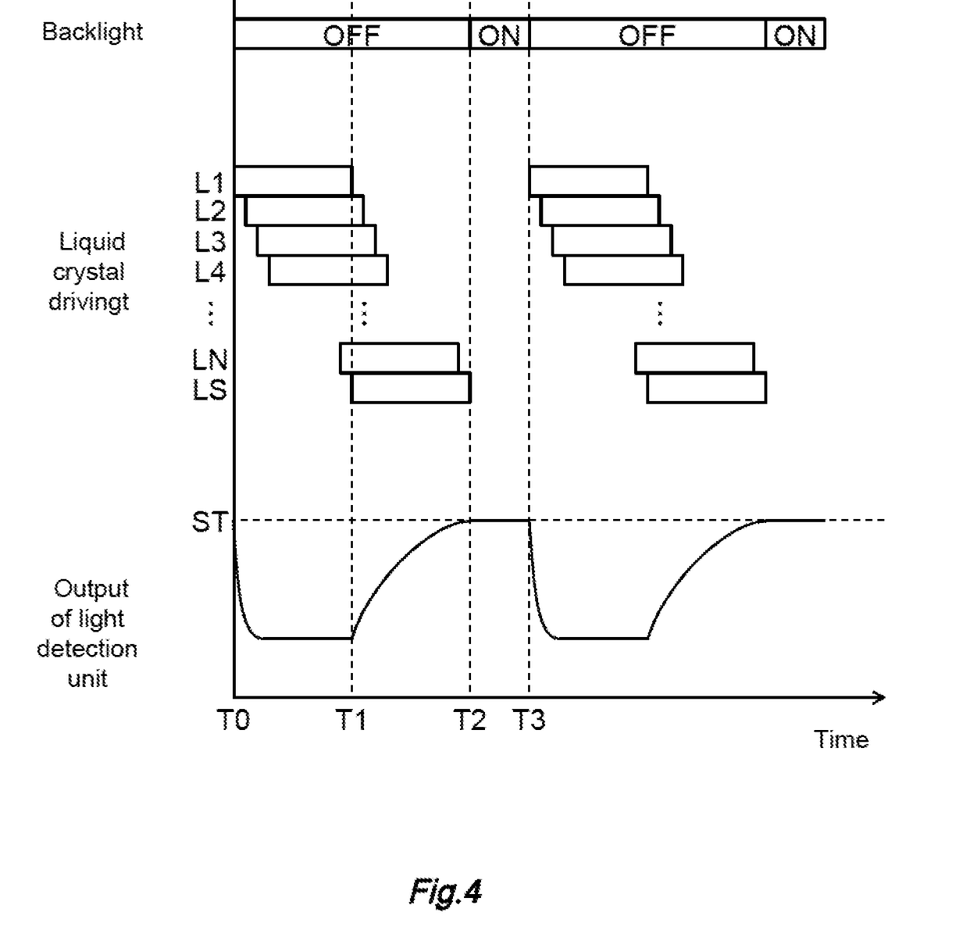
FIG. 4 is a timing chart illustrating timings of driving liquid crystal and timings of turning off and on the backlight.
Figure 5:
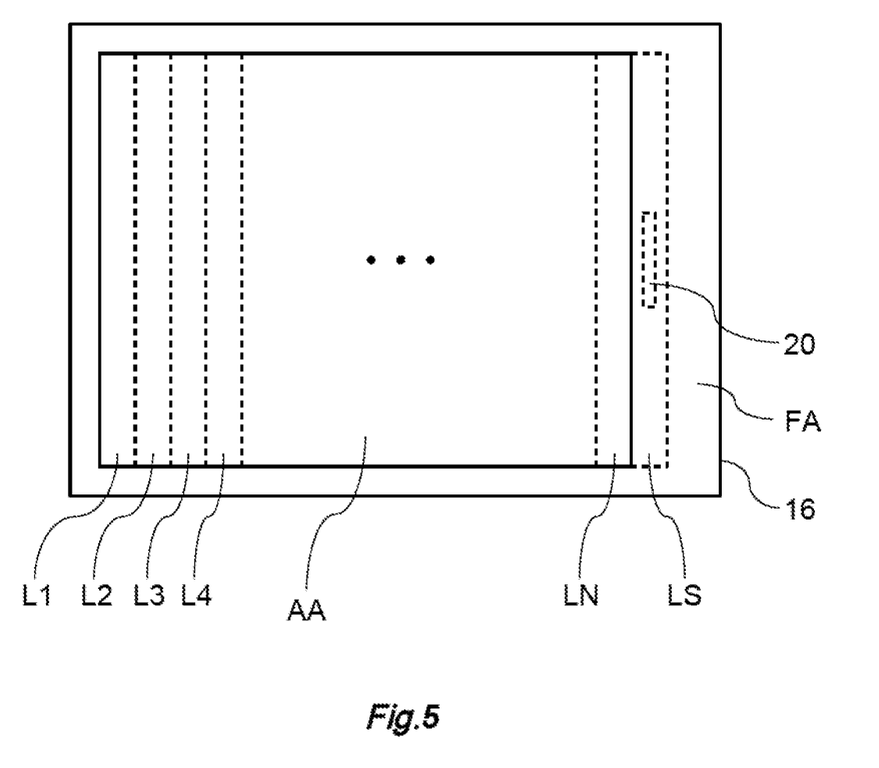
FIG. 5 is a top view of the liquid crystal display device 1, illustrating positions of portions of liquid crystal that are being driven.

FIG. 4 is a timing chart illustrating timings of driving liquid crystal and timings of turning off and turning on the backlight. FIG. 5 is a top view of the liquid crystal display device 1, illustrating positions of portions of liquid crystal that are being driven. As illustrated in FIG. 4, when the backlight 10 is turned off at time T0, a voltage signal is simultaneously (or alternatively, immediately after that) applied to liquid crystal, which causes the driving of liquid crystal to start.

Here, with respect to the liquid crystal held in the liquid crystal layer 13, the voltage signal is applied to portions of the liquid crystal as predetermined units for driving (hereinafter such portions are referred to as drive-unit portions) sequentially in a predetermined order. More specifically, as illustrated in FIG. 4, the voltage signal is applied to each liquid crystal line, in an order of the liquid crystal line L1, the liquid crystal line L2, the liquid crystal line L3, the liquid crystal line L4, . . . the liquid crystal line LN (N is a natural number), and the liquid crystal line LS. It should be noted that, after the application of the voltage signal, it takes a certain time for the driving of liquid crystal to be completed. In FIG. 4, a time that it takes after the application of the voltage signal to a certain liquid crystal line till the completion of the driving of all of liquid crystal included in the liquid crystal line is indicated with a void rectangle.

The following description specifically describes an operation when the voltage signal is applied to the liquid crystal lines L1 to LN, LS. For example, in a case where the liquid crystal display device 1 is of the active matrix type, a plurality of gate lines and a plurality of data lines vertical to the gate lines are provided. Further, at each point of intersection of the gate lines and the data lines, a thin film transistor (TFT) connected to the gate line and the data line, and a capacitor connected to the TFT are provided. The ON/OFF of the TFT is controlled with a voltage signal (gate signal) applied to the gate line. When the TFT is ON, a voltage signal (data signal) on the data line is input to the capacitor via the TFT, and is held. These, i.e., the gate line, the data line, the TFT, and the capacitor are provided as electrodes included in the lower glass substrate 12 (pixel electrodes).

In FIG. 4, the gate lines are provided in parallel with the liquid crystal lines L1 to LN, LS, so as to have one-to-one correspondence to them. Each liquid crystal line indicates a range of liquid crystal whose driving is controlled by one gate line as well as the TFT and the capacitor connected to the gate line. In the liquid crystal display device 1, first, a voltage signal for turning on the TFT is applied to the gate line corresponding to the liquid crystal line L1, and a gate signal for turning off the TFT is applied to the other gate lines. Further, a data signal to be applied to the liquid crystal line L1 is applied to the data line. This turns on a plurality of the TFTs connected to the gate line corresponding to the liquid crystal line L1, whereby data signals are held in the capacitors connected to these TFTs. The data signals are thus held in the capacitors, whereby liquid crystal included in the liquid crystal line L1 are driven. It should be noted that it takes a certain time after the data signals are held in the capacitors, until the driving of liquid crystal is completed. Then, before the driving of liquid crystal included in the liquid crystal line L1 is completed, a plurality of the TFTs connected to the gate line corresponding to the liquid crystal line L2 are turned on, whereby data signals are held in the capacitors connected to these TFTs. Further, regarding the liquid crystal line L3 and those subsequent to the same, liquid crystal is driven in the same manner.

According to the illustration in FIG. 4, time that it takes to drive liquid crystal is substantially uniform throughout all of the liquid crystal lines. However, as described above, applied data signals could vary with the liquid crystal lines and the data lines (i.e., the pixels). Actually, therefore, the time that it takes to drive liquid crystal could vary with the liquid crystal lines, and even in one same liquid crystal line, the time that it takes to drive liquid crystal could varies with the portions of the liquid crystal.

As illustrated in FIG. 5, the liquid crystal line LS is a liquid crystal line that includes a liquid crystal portion positioned right above the light detection unit 20. The liquid crystal line LS is arranged so as to cover an upper part of the light detection unit 20. FIG. 5 illustrates an exemplary case where the liquid crystal line LS has the same length as that of the other liquid crystal lines L1 to LN. The liquid crystal line LS is made of the same material as that of the other liquid crystal lines L1 to LN. Further, the liquid crystal line LS is a liquid crystal line to which a voltage signal is applied last in the liquid crystal layer 13, and whose liquid crystal is started to be driven last. Incidentally, according to the illustration in FIG. 5, the liquid crystal line LS is adjacent to the liquid crystal line LN in the display area AA, but the liquid crystal line LS and the liquid crystal line LN may be distant from each other. For example, another liquid crystal line may be present between the liquid crystal line LS and the liquid crystal line LN.

As illustrated in FIG. 4, when the driving of liquid crystal included in the liquid crystal line LS is started at T1, the amount of light incident on the light detection unit 20 fluctuates, which causes the output of the light detection unit 20 to change. Thereafter, when the driving of liquid crystal is completed, the intensity of light detected by the light detection unit 20 enters a steady state. This steady state is a state in which the intensity of light detected by the light detection unit 20 does not fluctuate, but remains constant for a predetermined period or more. Further, the light incident on the light detection unit 20 is not light emitted by the backlight 10, but light getting in from the outside of the liquid crystal display device 1 through the opening of the bezel 16. Incidentally, FIG. 4 illustrates an exemplary case where, with the driving of liquid crystal included in the liquid crystal line LS, the amount of light incident on the light detection unit 20 increases, which causes the output of the light detection unit 20 to increase.

When the driving of the liquid crystal included in the liquid crystal line LS is completed at T2 shown in FIG. 4, the intensity of light detected by the light detection unit 20 enters a steady state, whereby the output of the light detection unit 20 also enters a steady state. At the point in time when the intensity of light detected by the light detection unit 20 enters a steady state, then, the control unit turns on the backlight 10. For example, in a case where the output of the light detection unit 20 becomes equal to or greater than a predetermined threshold value ST, the control unit 30 determines that the intensity of light detected by the light detection unit 20 enters a steady state, and turns on the backlight 10.

Then, at time T3, the backlight 10 is turned off, and the application of a voltage signal is again started with the liquid crystal line L1. For example, the backlight 10 is turned off in synchronization with the fluctuation timings of a perpendicular synchronization signal that fluctuates at a predetermined frequency. Further, for example, the driver IC applies a voltage signal in synchronization with the fluctuation timings of the perpendicular synchronization signal, sequentially starting with the liquid crystal line L1.

In this way, in the liquid crystal display device 1, the control unit 30 confirms that the driving of liquid crystal is completed, based on the output of the light detection unit 20, and then, turns on the backlight 10. In the liquid crystal display device 1, therefore, it is possible to effectively suppress blurring of a moving image.

Incidentally, the timing at which the driving of the liquid crystal line LS is started, and the voltage applied to the liquid crystal portion positioned right above the light detection unit 20, are arbitrary. However, with a view to effectively suppressing blurring of a moving image in the liquid crystal display device 1, such a configuration is preferable that the backlight 10 is turned on after the driving of as much liquid crystal as possible, among the liquid crystal included in the liquid crystal layer 13, is completed. In other words, it is preferable that the timing at which the driving of a liquid crystal portion positioned right above the light detection unit 20 is completed is relatively later among the liquid crystal included in the liquid crystal layer 13.

More specifically, it is preferable that the driving of the liquid crystal line LS is started last in the liquid crystal layer 13, as is in the exemplary case illustrated in FIG. 4. Further, it is preferable that a voltage that maximizes time that it takes from the start of driving of liquid crystal till the completion of the same is applied to the liquid crystal portion positioned right above the light detection unit 20. Further, in a case where both of the above-described conditions are satisfied, the timing at which the driving of the liquid crystal portion positioned right above the light detection unit 20 is completed is made the latest among the liquid crystal included in the liquid crystal layer 13. In this case, therefore, it is possible to turn on the backlight 10 at the point in time when the driving of all of the liquid crystal included in the liquid crystal layer 13 is completed, which makes it possible to prevent the blurring of a moving image completely.

Incidentally, the voltage that maximizes time that it takes from the start of driving till the completion of the same depends on the display method. For example, in the VA method or the IPS method, a voltage having a magnitude that causes a state to be changed from the darkest state where no voltage is applied to a darker gray state where light is slightly transmitted is a voltage that maximizes time that it takes from the start of driving till the completion of the same. More specifically, in the VA method, in a case where the brightness ranges over 256 levels, 0 to 255, the time it takes from the start of driving till the completion of the same is maximized when the brightness is changed from the level of 0 (black) to the level of 31 (darker gray). Likewise, in the IPS method, in a case where the brightness ranges over 256 levels, 0 to 255, the time it takes from the start of driving till the completion of the same is maximized when the brightness is changed from the level of 0 (black) to the level of 95 (darker gray).

Further, the liquid crystal included in the liquid crystal line LS may be started to be driven alone, as is in the exemplary case illustrated in FIG. 4, or alternatively, may be started to be driven simultaneously with the driving of liquid crystal included in another liquid crystal line positioned in the display area AA (for example, the liquid crystal line LN).

Embodiment 2

Next, the following description describes Embodiment 2. Incidentally, in the following description, when the same reference symbol as that in Embodiment 1 is used, it denotes the same constituent member as that in Embodiment 1, and the previous description of the same should be referred to unless otherwise described.

Figure 6:
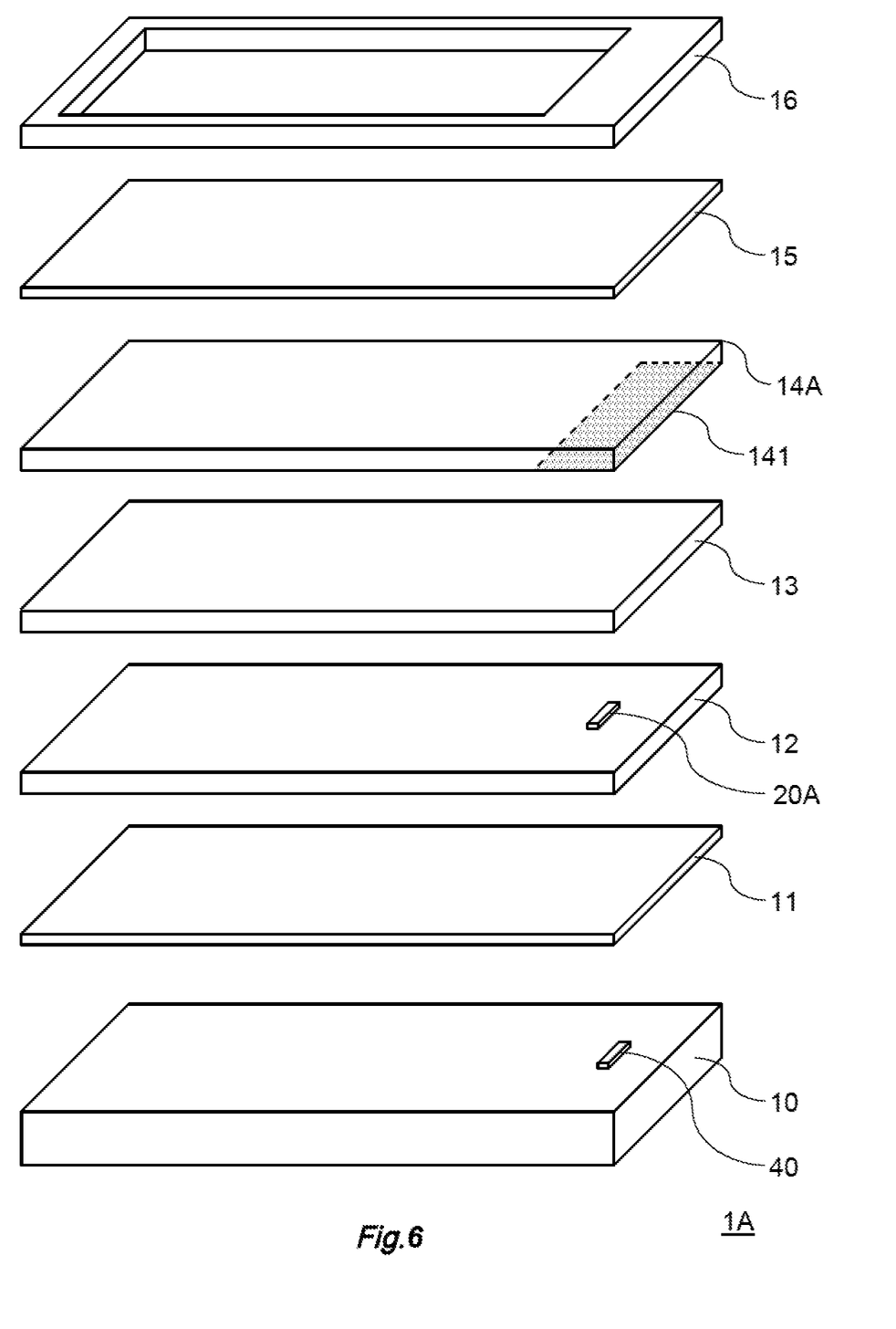
FIG. 6 is an exploded perspective view illustrating a schematic configuration of a liquid crystal display device 1A according to Embodiment 2.

FIG. 6 is an exploded perspective view illustrating a schematic configuration of a liquid crystal display device 1A according to Embodiment 2. As illustrated in FIG. 6, the liquid crystal display device 1A includes a backlight 10, a lower polarizing plate 11, a lower glass substrate 12, a liquid crystal layer 13, an upper glass substrate 14, an upper polarizing plate 15, and a bezel 16. Further, the liquid crystal display device 1A includes a control unit 30.

Still further, the liquid crystal display device 1A includes a light detection unit 20A and a light emission unit 40. The light detection unit 20A is provided between the liquid crystal layer 13 and the backlight 10. The light emission unit 40 is arranged between the light detection unit 20 and the backlight 10. Incidentally, FIG. 6 illustrates an exemplary case where the light detection unit 20A is arranged on an upper surface of the lower glass substrate 12, and the light emission unit 40 is arranged on an upper surface of the backlight 10. Further, the light emission unit 40 emits light that is not perceived by a human, for example, infrared light. Still further, the light detection unit 20A is formed with light receiving elements that are capable of detecting light emitted by the light emission unit 40.

Still further, in the liquid crystal display device 1A, a rugged part 141 is provided on a lower surface of the upper glass substrate 14A. The rugged part 141 reflects light emitted upward by the light emission unit 40 downward. This rugged part 141 is equivalent to a reflection unit. Incidentally, the rugged part 141 may have, for example, a micro-reflective structure (MRS), which is used for reflecting external light when reflection-type liquid crystal is used. In the liquid crystal display device 1A, light emitted by the light emission unit 40 is reflected by the rugged part 141, and is detected by the light detection unit 20A.

The light emission unit 40 emits light at least during a period while liquid crystal included in the liquid crystal line LS is driven (the period from T1 to T2 in FIG. 4). It should be noted that the light emission unit 40 may emit light during a period from the start of driving of liquid crystal included in the liquid crystal line L1 till the completion of the driving of liquid crystal included in the liquid crystal line LS (the period from T1 to T2 in FIG. 4), or alternatively, may always emit light while the liquid crystal display device 1A is operating.

In the liquid crystal display device 1A, light emitted and reflected inside the liquid crystal display device 1A is detected by the light detection unit 20A. In the liquid crystal display device 1A, therefore, it is unlikely that the output of the light detection unit 20A would be influenced by external environments. In the liquid crystal display device 1A, therefore, it is possible to more effectively suppress blurring of a moving image. Further, in the liquid crystal display device 1A, the reflection unit can be provided with use of existing members.

Embodiment 3

Next, the following description describes Embodiment 3. Incidentally, in the following description, when the same reference symbol as that in Embodiments 1 and 2 is used, it denotes the same constituent member as that in Embodiments 1 and 2, and the previous description of the same should be referred to unless otherwise described.

Figure 7:
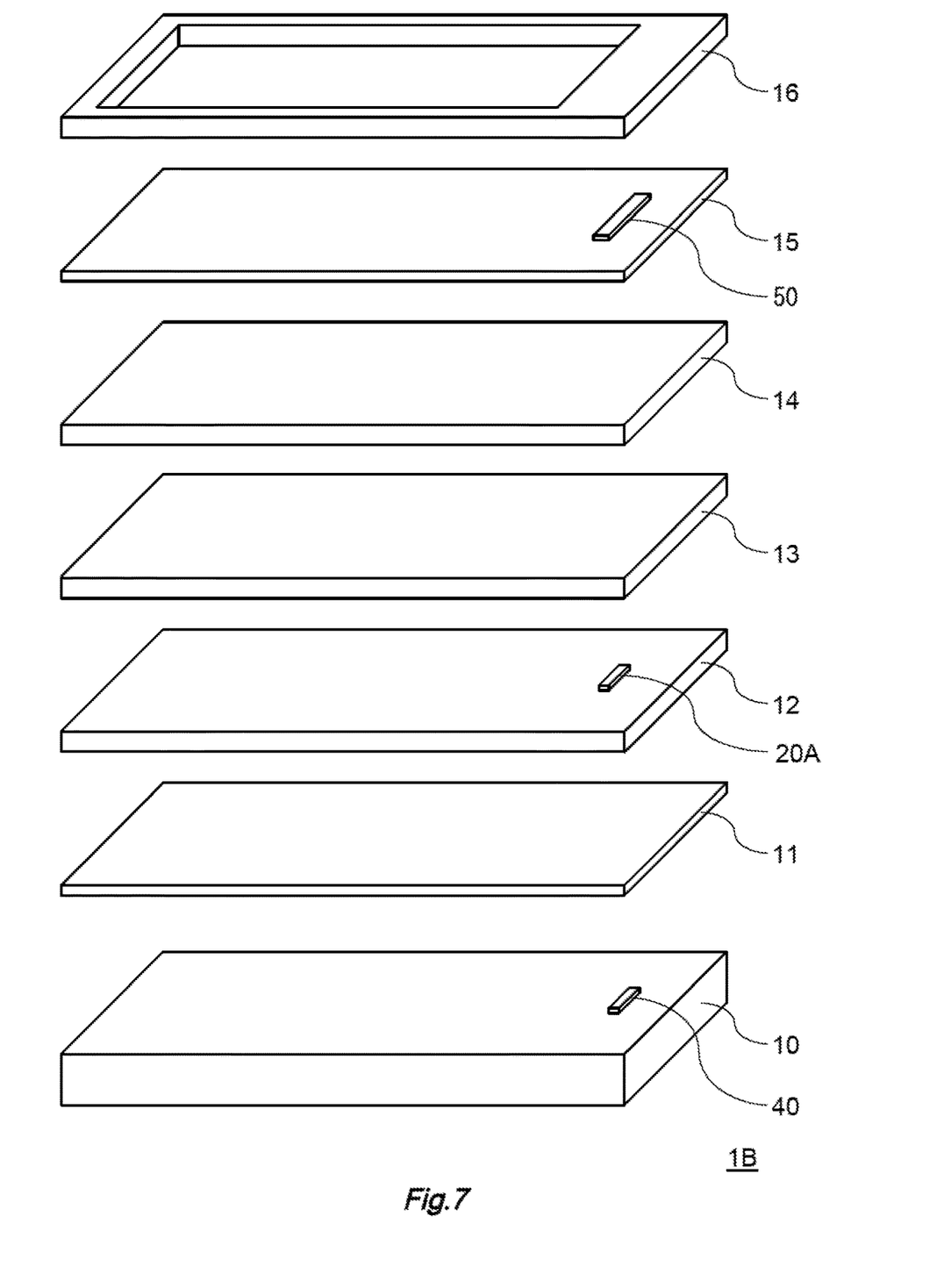
FIG. 7 is an exploded perspective view illustrating a schematic configuration of a liquid crystal display device 1B according to Embodiment 3.

FIG. 7 is an exploded perspective view illustrating a schematic configuration of a liquid crystal display device 1B according to Embodiment 3. As illustrated in FIG. 7, the liquid crystal display device 1B includes a backlight 10, a lower polarizing plate 11, a lower glass substrate 12, a liquid crystal layer 13, an upper glass substrate 14, an upper polarizing plate 15, a bezel 16, a light detection unit 20A, and a light emission unit 40. Further, the liquid crystal display device 1B includes a control unit 30.

Still further, the liquid crystal display device 1B includes a reflection plate 50 arranged above the upper polarizing plate 15. Incidentally, FIG. 7 illustrates an exemplary case where the reflection plate 50 is arranged on an upper surface of the upper polarizing plate 15. The reflection plate 50 reflects light emitted upward by the light emission unit 40 downward. This reflection plate 50 is equivalent to a reflection unit. In the liquid crystal display device 18, light emitted by the light emission unit 40 is reflected by the reflection plate 50, and is detected by the light detection unit 20A.

In the liquid crystal display device 1B as well, as is the case with the liquid crystal display device 1A according to Embodiment 2, light emitted and reflected inside the liquid crystal display device 1B is detected by the light detection unit 20A. Therefore, in the liquid crystal display device 18 as well, it is unlikely that the output of the light detection unit 20A would be influenced by external environments.

Further, in the liquid crystal display device 18, light that has been transmitted through the lower polarizing plate 11, the liquid crystal layer 13, as well as the upper polarizing plate 15, and has been reflected by the reflection plate 50, is detected by the light detection unit 20A. Here, the intensity of light transmitted through the upper polarizing plate 15 greatly fluctuates depending on the state in which the liquid crystal is being driven, as is the case with an image displayed in the display area AA. Therefore, the intensity of light detected by the light detection unit 20A also greatly fluctuates depending on the state in which the liquid crystal is being driven. This therefore allows the control unit 30 to precisely detect the point in time when the intensity of light detected by the light detection unit 20A enters a steady state.

In this way, in the liquid crystal display device 1B, it is unlikely that the output of the light detection unit 20A would be influenced by external environments, which improves the detection accuracy of the control unit 30. Therefore, it is possible to more effectively suppress blurring of a moving image.

Modification Example

The embodiments described above are merely examples for implementing the present invention. The present invention, therefore, is not limited to the above-described embodiments, and the above-described embodiments can be appropriately varied and implemented without departing from the spirit and scope of the invention.

For example, the above-described embodiments are described with reference to an exemplary case where the light detection unit 20 or 20A is arranged in the frame area FA. The light detection unit 20 or 20A, however, may be arranged in the display area AA. In this case as well, for example, the light detection unit is arranged in a less noticeable part in the display area AA, and a specific voltage may be applied to the liquid crystal portion positioned right above the light detection unit, as is the case with Embodiments 1 to 3 described above.

On the other hand, a voltage signal for displaying an image may be applied to the liquid crystal portion positioned right above the light detection unit, in a case where the light detection unit is arranged in the display area AA. In this case, for example, a plurality of light detection units are arranged in the display area AA. Then, the control unit 30 may turn on the backlight 10 at the point in time when the intensities of light detected by all of the light detection units enter a steady state. Alternatively, the configuration may be such as follows: based on the liquid crystal driving order and the applied voltage signal, the control unit 30 identifies a liquid crystal portion positioned right above the light detection unit, driving of which is completed at the latest timing; and when the intensity of light detected by the light detection unit right under the liquid crystal portion thus identified enters a steady state, the control unit 30 turns on the backlight 10.

The liquid crystal display device 1 according to Embodiment 1 has a simple configuration that does not include a light emission unit inside, in which the light detection unit 20 detects light getting in from the outside through the opening of the bezel 16. This configuration of the liquid crystal display device 1 may be applied to, for example, a liquid crystal display device in which light entering the display area AA hardly fluctuates, such as a head-mounted display.

Further, the above-described embodiments are described with reference to an exemplary case where, when the output of the light detection unit 20 reaches a threshold value ST, the control unit 30 determines that the intensity of light detected by the light detection unit 20 enters a steady state. Such a determination method is preferably adopted, for example, in a case where it is proven that the output of the light detection unit 20 after the driving of liquid crystal is completed becomes constant at a level equal to or slightly greater than the threshold value ST. However, the configuration may be such that the control unit 30 determines, in a certain manner other than this, that the intensity of light detected by the light detection unit 20 enter a steady state.

For example, the configuration may be such that, at the point in time when an amount of change in the output of the light detection unit 20 per unit time becomes equal to or smaller than a predetermined value, the control unit 30 determines that the intensity of light detected by the light detection unit 20 enters a steady state. Further, for example, the configuration may be such that, at the point in time when the derivative of the output of the light detection unit 20 becomes equal to or smaller than a predetermined value, the control unit 30 determines that the intensity of light detected by the light detection unit 20 enters a steady state. However, it is preferable that the control unit 30 executes any of these determination methods after the driving of the liquid crystal line LS is started, so as to determine whether or not the intensity of light detected by the light detection unit 20 enter a steady state.

The above-described liquid crystal display device can be described as follows.

A liquid crystal display device includes: a backlight; a liquid crystal layer that is arranged on the backlight, and includes liquid crystal that is driven in response to a voltage applied thereto; a light detection unit that is arranged between the backlight and the liquid crystal layer; and a control unit that controls a timing of turning on the backlight, wherein, after the backlight is turned off and the driving of liquid crystal is started, the control unit turns on the backlight when intensity of light detected by the light detection unit enters a steady state (the first configuration).

According to this configuration, the control unit confirms that the driving of liquid crystal is completed, based on an output of the light detection unit, and then, turns on the backlight. In this configuration, therefore, it is possible to effectively suppress blurring of a moving image.

The first configuration may be further characterized in that drive-unit portions of the liquid crystal are sequentially started to be driven in a predetermined order; and one of the drive-unit portions that includes a liquid crystal portion positioned right above the light detection unit is started to be driven last in the liquid crystal layer (the second configuration). Further, the first or second configuration may be further characterized in that a voltage is applied to the liquid crystal portion positioned right above the light detection unit, the voltage being a voltage that maximizes time that it takes from the start of driving till the completion of the driving (the third configuration).

With the second or third configuration, the timing at which the driving of the liquid crystal portion positioned right above the light detection unit is completed is relatively later among the liquid crystal included in the liquid crystal layer. In these configurations, therefore, it is possible to effectively suppress blurring of a moving image. Particularly in a case where the second and third configurations are combined, the timing at which the driving of the liquid crystal portion positioned right above the light detection unit is completed is made the latest among the liquid crystal included in the liquid crystal layer. In this case, therefore, it is possible to turn on the backlight at the point in time when the driving of all of the liquid crystal included in the liquid crystal layer is completed, which makes it possible to prevent the blurring of a moving image from occurring.

Any one of the first to third configurations may be further characterized in further including a light emission unit that emits light having a wavelength that is not perceived by a human but is detected by the light detection unit; and a reflection unit that reflects light emitted upward by the light emission unit downward, wherein the light emission unit is arranged between the light detection unit and the backlight, and the reflection unit is arranged above the liquid crystal layer (the fourth configuration).

With this configuration, light that has been emitted and reflected inside the liquid crystal display device is detected by the light detection unit. In the liquid crystal display device, therefore, it is unlikely that the output of the light detection unit would be influenced by external environments. In the liquid crystal display device, therefore, it is possible to more effectively suppress blurring of a moving image.

The fourth configuration may be further characterized in that a lower surface of a predetermined member arranged above the liquid crystal layer includes a rugged part, and light emitted by the light emission unit is reflected by the rugged part (the fifth configuration). According to this configuration, a reflection unit can be provided with use of an existing member.

The fourth configuration may be further characterized in further including a lower polarizing plate that is arranged between the backlight and the light detection unit, and selectively transmits a light component that oscillates in a first direction; and an upper polarizing plate that is arranged above the liquid crystal layer, and selectively transmits a light component that oscillates in a second direction, wherein the reflection unit is a reflection plate that is arranged above the upper polarizing plate.

With this configuration, the intensity of light detected by the light detection unit greatly fluctuates depending on a state in which liquid crystal is being driven. This therefore allows the control unit to precisely detect the point in time when the intensity of light detected by the light detection unit enters a steady state. In this configuration, therefore, it is unlikely that the output of the light detection unit would be influenced by external environments, and furthermore, the detection accuracy of the control unit is improved, whereby it is possible to further more effectively suppress blurring of a moving image.

DESCRIPTION OF REFERENCE NUMERALS 1, 1A, 1B: liquid crystal display device
10: backlight
11: lower polarizing plate
12: lower glass substrate
13: liquid crystal layer
14, 14A: upper glass substrate
141: rugged part
15: upper polarizing plate
16: bezel
20, 20A: light detection unit
30: control unit
40: light emission unit
50: reflection plate
L1 to LN, LS: liquid crystal line
AA: display area
FA: frame area

What is claimed is:

1. A liquid crystal display device comprising:
   a backlight;
   a liquid crystal layer that is arranged on the backlight, and includes liquid crystal that is driven in response to a voltage applied thereto;
   a light detection unit that is arranged between the backlight and the liquid crystal layer;
   a control unit that controls a timing of turning on the backlight;
   a light emission unit that emits light having a wavelength that is not perceived by a human but is detected by the light detection unit; and
   a reflection unit that reflects light emitted upward by the light emission unit downward,
   wherein, after the backlight is turned off and the driving of liquid crystal is started, the control unit turns on the backlight when intensity of light detected by the light detection unit enters a steady state, and
   the light emission unit is arranged between the light detection unit and the backlight, and the reflection unit is arranged above the liquid crystal layer.

2. The liquid crystal display device according to claim 1, wherein drive-unit portions of the liquid crystal are sequentially started to be driven in a predetermined order, and
   one of the drive-unit portions that includes a liquid crystal portion positioned right above the light detection unit is started to be driven last in the liquid crystal layer.

3. The liquid crystal display device according to claim 1, wherein a voltage is applied to the liquid crystal portion positioned right above the light detection unit, the voltage being a voltage that maximizes time that it takes from the start of driving till the completion of the driving.

4. The liquid crystal display device according to claim 1, wherein the reflection unit is a rugged part that is formed on a lower surface of a predetermined member arranged above the liquid crystal layer.

5. The liquid crystal display device according to claim 1, further comprising:
   a lower polarizing plate that is arranged between the backlight and the light detection unit, and selectively transmits a light component that oscillates in a first direction; and
   an upper polarizing plate that is arranged above the liquid crystal layer, and selectively transmits a light component that oscillates in a second direction,
   wherein the reflection unit is a reflection plate that is arranged above the upper polarizing plate.

* * * * *